(12) United States Patent
Sankara Rama Subramanian et al.

(10) Patent No.: US 9,275,085 B2
(45) Date of Patent: Mar. 1, 2016

(54) DATA PROCESSING SYSTEM AND METHOD

(75) Inventors: Venkataraman Sankara Rama Subramanian, Bangalore (IN); Viji Koshy, Bangalore (IN); Manikandan Krishnan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1040 days.

(21) Appl. No.: 12/140,281

(22) Filed: Jun. 17, 2008

(65) Prior Publication Data
US 2009/0276472 A1      Nov. 5, 2009

(30) Foreign Application Priority Data
May 5, 2008   (IN) .......................... 1109/CHE/2008

(51) Int. Cl.
*G06F 17/30*   (2006.01)
*G06F 17/22*   (2006.01)

(52) U.S. Cl.
CPC ...... *G06F 17/30309* (2013.01); *G06F 17/2211* (2013.01); *G06F 17/2288* (2013.01)

(58) Field of Classification Search
CPC .......................... G06F 17/2211; G06F 17/2288
USPC .................. 707/999.101, 999.102, 999.202, 707/999.203, 999.001, 999.005, 638, 694, 707/695
See application file for complete search history.

(56) References Cited

U.S. PATENT DOCUMENTS

| 5,493,671 | A | * | 2/1996 | Pitt et al. ................ 707/999.203 |
| 5,860,072 | A | | 1/1999 | Schofield |
| 6,216,136 | B1 | * | 4/2001 | Ronstrom ............. 707/999.101 |
| 6,915,287 | B1 | * | 7/2005 | Felsted et al. .......... 707/999.001 |
| 6,971,093 | B1 | | 11/2005 | Spring |
| 7,092,972 | B2 | * | 8/2006 | Kashyap ...................... 707/625 |
| 7,610,298 | B2 | * | 10/2009 | Zaytsev et al. ......... 707/999.102 |
| 2003/0212717 | A1 | * | 11/2003 | Kashyap ...................... 707/203 |
| 2004/0260715 | A1 | * | 12/2004 | Mongeon et al. ............. 707/101 |

* cited by examiner

*Primary Examiner* — Vincent F Boccio
(74) *Attorney, Agent, or Firm* — HGF Limited

(57) ABSTRACT

A method of interpreting data in a first version of a data structure, the method comprising determining if the first version of the data structure is different to a currently used version of the data structure; and if the versions are different, then for each field of the currently used version of the data structure, determining if a corresponding field is present in the first version of the data structure; and if not, adding data to the field in the currently used version of the data structure according to interpretation rules.

8 Claims, 5 Drawing Sheets

|     | V1    | V2    |
| --- | ----- | ----- |
| A   | R1    | R2    |
| B   | R3    | R3    |
| var1 | PS2V1 | PS2V2 |
| var2 | PS3V1 | NULL  |
| var3 | NULL  | PS4V1 |

|    | Type | Size | Default | Corresponding |
| -- | ---- | ---- | ------- | ------------- |
| R1 | int  | 2    | -       | V2 A          |
| R2 | char | 1    | -       | V1 A          |
| R3 | long | 4    | 0       | -             |

|   | V1   | V2   |
| - | ---- | ---- |
| C | R4   | R5   |
| D | R6   | NULL |
| F | NULL | R7   |

|     | Type | Size | Default | Corresponding |
|-----|------|------|---------|---------------|
| R4  | int  | 2    | -       | V2 C          |
| R5  | long | 4    | -       | V1 C          |
| R6  | int  | 2    | 0       | -             |
| R7  | char | 1    | 'B'     | -             |
600
Figure 6
700
Figure 7
|     | Type | Size | Default | Corresponding |
|-----|------|------|---------|---------------|
| R8  | int  | 2    | -       | -             |
800
Figure 8
900
Figure 9

|   | Type | Size | Default | Corresponding |
|---|------|------|---------|---------------|
| R9 | int | 2 | - | - |

1000

1100

DATA PROCESSING SYSTEM AND METHOD

RELATED APPLICATIONS

Benefit is claimed under 35 U.S.C. 119(a)-(d) to Foreign application Serial No. 1109/CHE/2008 entitled "DATA PROCESSING SYSTEM AND METHOD" by Hewlett-Packard Development Company, L.P., filed on 5 May 2008, which is herein incorporated in its entirety by reference for all purposes.

BACKGROUND TO THE INVENTION

In a distributed system, two entities can communicate with each other using data structures. That is, for example, one of the entities constructs a block of data in which information is arranged in a predefined structure. This block of data is then sent to the other entity, which then interprets the information in the block of data. The entities may comprise, for example, processes in a distributed system that are using inter-process communication (IPC) techniques to communicate with each other.

One of the entities may undergo a version change that also changes the version of the data structure that it constructs and/or interprets. The other entity must therefore also undergo a version change so that both of the entities use the same version of the data structure for undisrupted communication.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which:

FIG. 3 shows an example of a version table according to embodiments of the invention;

FIG. 4 shows an example of a table containing version records according to embodiments of the invention;

FIG. 5 shows an example of a version table for a further data structure;

FIG. 6 shows another example of a table containing version records;

FIG. 7 shows another example of a version table for a further data structure;

FIG. 8 shows another example of a table containing version records;

FIG. 9 shows another example of a version table for a further data structure;

DETAILED DESCRIPTION OF EMBODIMENTS OF THE INVENTION

Embodiments of the invention allow different entities to use different versions of the same data structure reliably without the requirement that both entities use the same version of the data structure. For example, when a first entity undergoes a version change that changes the version of the data structure that the first entity uses, it can still communicate with a second entity even if the second entity uses a different version of the data structure. Therefore, for example, the first entity can send a first version of the data structure to the second entity. The second entity may expect to receive a second version of the data structure, which may be an older or newer version. In embodiments of the invention, the second entity can still interpret data from the first version of the data structure. Thus, there is no requirement for the second entity to be changed to a new version that uses the same version of the data structure as the first entity. Furthermore, there is no requirement for downtime that would be associated with a change in version of the second entity, as a change in version of the second entity may cause the second entity to become unavailable for a period.

Embodiments of the invention allow two entities using different versions of a data structure to communicate using the data structure by providing interpretation rules. Interpretation rules describe, for example, how data from fields of one version of the data structure can be interpreted to fit into the fields of the second version of the data structure. The interpretation rules may also describe, for example, default values that fields of one version of a data structure should adopt if the corresponding field is not present in another version of the data structure.

Below is an example of a first version of a data structure described using the C/C++ programming language:

```
struct S1
{
    int A;
    long B;
    struct S2 var1;
    struct S3 var2;
};
struct S2
{
    int C;
    int D;
};
struct S3
{
    int I;
};
```

Figure 1:
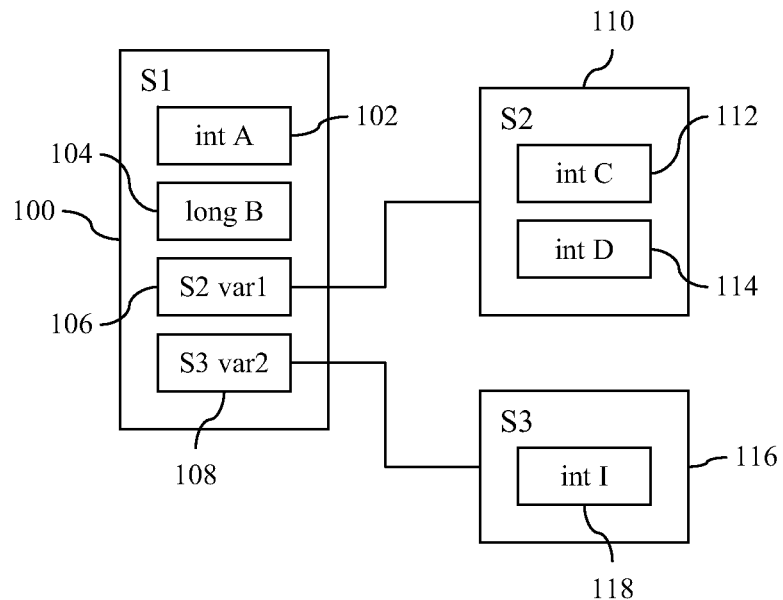
FIG. 1 shows an example of a first version of a data structure.

The structure S1 includes an integer field A, a long integer field B, and two further structures var1 and var2, which are described by structures S2 and S3, respectively. FIG. 1 illustrates the structure of the first version 100 of the data structure. The first version 100 includes a structure S1 that comprises an int A field 102, long B field 104, S2 structure field 106 and S3 structure field 108. The S2 structure var1 field 106 contains or points to a first version 110 of an S2 structure. This S2 structure first version 110 contains an int C field 112 and an int D field 114. The S3 structure var2 field 108 contains or points to a first version 116 of an S3 structure. The version 116 of the S3 structure contains an int I field 118.

Each field has a name and a type. For example, the int A field 102 has an int (integer) type and the name A. The S2 structure var1 field 106 has a type of struct S2 and the name var1.

Below is a second version of the above data structure:

```
struct S1
{
    char A;
```

```
        long B;
        struct S2 var1;
        struct S4 var3;
};
struct S2
{
        long C;
        char F;
};
struct S4
{
        int J;
};
```

Figure 2:
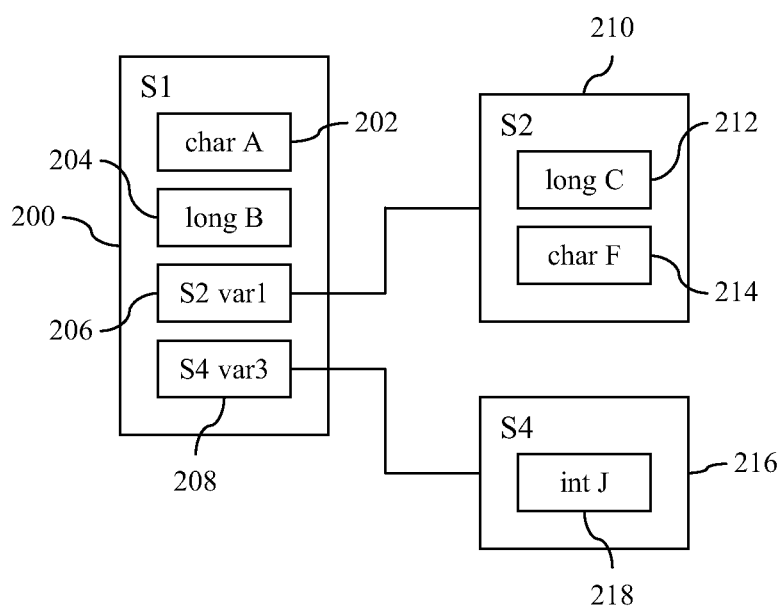
FIG. 2 shows an example of a second version of the data structure.

The second version 200 of the data structure S1, shown in FIG. 2, includes a char A field 202, long B field 204, S2 structure var1 field 206 and S4 structure var3 field 208. Thus, the second version 200 includes long B field 204 that corresponds to long B field 104 in the first version 100 of the data structure. That is, the field is present in both versions of the data structure.

Either version of the data structure may be sent (containing information) from one entity to another. The data structure may, for example, be embedded within some other form of communication. In embodiments of the invention, the data structure may be sent without information that differentiates data between different fields of the data structure. For example, the data structure may be sent as a block of data bytes without markers showing where data from one field ends and another begins. Therefore, knowledge of the structure of the received data structure may be used to determine where in the block of bytes information appropriate to a particular field is located.

The data structure, shown as first version 100 and second version 200 above, is associated with a version table 300, shown in FIG. 3. The version table 300 has entries for each field name that appears in any version of the data structure against all the versions of the data structure. Therefore, for example, there are entries for the variable named A for both the first and second versions of the data structure.

Each entry in the table, corresponding to a single variable name and data structure version, contains or points to a field version record, a pointer to a further data structure version table, or an indicator that the entry is empty (for example a NULL character). A version record is present in an entry for a particular name and data structure version where a field with that name appears in the data structure of that version. A NULL (or other indicator) is present where a field with that name does not appear in the data structure of that version. For example, there is a version record (R1 in FIG. 3) for the field A 102 in the first version 100 of the data structure, but there is a NULL for the field named var3 in the first version 100.

FIG. 4 shows an example of a version record table 400 including all of the version records (R1, R2 and R3) from the version table 300. Each version record corresponds to a field in the data structure and indicates a type of data (such as integer, for example) that is stored in the field and the size of the field. The version record also includes interpretation rules. The interpretation rules provide rules as to what data to insert into one version of the data structure if it contains fields where corresponding fields are not found in another version of the data structure.

For example, a data structure may be received that is of a first version. However, the entity that received the data structure may be expecting a different version of the data structure. That is, the currently used version of the receiving entity is different to the version of the received data structure. There may be fields in the version of the data structure used by the receiving entity that are not present in the received version of the data structure. The interpretation rules provide a way to populate the version of the data structure used by the receiving entity, for example by using data from the received version of the data structure. For example, the interpretation rules may include rules to populate certain fields by extracting information from other fields or types of field from the received version of the data structure, and/or rules that provide default values when corresponding information is not present in the received version of the data structure.

For example, the record R1 shown in FIG. 4 corresponds to the int A field 102 of the first version 100 of the data structure. The record R1 indicates that the field is of int (integer) type and that its size is 2, for example 2 bytes. The interpretation rules for each record comprise a default value and a "corresponding" entry. The default value is empty or undefined in the record R1 as corresponding information can be found in the second version 200 of the data structure. The "corresponding" entry indicates the field in the second version 200 of the data structure that contains information that can be extracted to form the contents of the field in the first version 100. In the case of the record R1, the "corresponding" entry indicates that the field in the second version (V2) 200 with the name A contains the information. Embodiments of the invention may extract the information from the field in the second version 200 to form the contents of the field in the first version 100. Embodiments of the invention may also perform appropriate conversion of the information where the information is of a different type. For example, when extracting information from the char A field 202 of the second version of the data structure, as the information is of "char" type and 1 byte long it is converted into a 2-byte "int" type corresponding to the type of the A field 102 of the first version 100 of the data structure.

In embodiments of the invention where appropriate information cannot be extracted from another version of the data structure, the "corresponding" entry is empty and a default value is provided in the "default" entry.

The version records may be implemented, for example, in embodiments of the invention as a table such as table 400. The version table for a data structure may therefore include entries that point to rows of the table containing the version records. Alternatively, for example, the version records may be contained within the version table.

Where an entry in the version table 300 corresponds to a data structure field, such as var1, var2 or var3, then the entry comprises a pointer to a further version table that describes versions of a further data structure. Where there are multiple versions of the further data structure, the pointer may point to a particular version in the version table of the further data structure.

For example, the first version 100 of the data structure contains a further data structure, which is S2 structure var1. The var1 field 106 comprises a first version 110 of the S2 data structure. However, the var1 field 206 in the second version 200 of the data structure comprises a second version 210 of the S2 data structure. Therefore, the version table 300 contains a pointer (PS2V1) to the first version in the version table of structure S2 for the field var1 in the first version (V1) 100 of the data structure, and a pointer (PS2V2) to the second version in the version table of structure S2 for the field var1 in the second version (V2) 300 of the data structure.

FIG. 5 shows an example of a version table 500 for a further data structure. The version table 500 is the version table for the further data structure S2. Thus, for example, the pointer PS2V1 in the version table 300 points to the first version V1 in the version table 500, and the pointer PS2V2 points to the second version V2 in the version table 500. The version table 500 points to or contains records R4, R5, R6 and R7. These records are shown in a table 600 in FIG. 6.

Thus, for example, the first version 100 of the data structure includes a first version of a further data structure, being the first version of the S2 data structure, named var1. var1 thus contains, for example, an integer D. The second version 200 of the data structure contains a different version of the further data structure S2, called var1. Thus, var1 in the second version 200 of the data structure contains a char (character) F.

Therefore, for example, an entity may be using (and may be expecting to receive) the first version 100 of the data structure. If this entity receives the second version 200 of the data structure from another entity, then the received data structure does not contain data corresponding to the integer D in var1. Thus, the record R6, shown in the table 600 in FIG. 6, is used to assign a default value of 0 to the integer D. The received data structure includes a character F. However, this information is not used as it is not present in the version of the data structure expected by the receiving entity.

Also, for example, the received data structure does not contain data corresponding to variable C with type "int" in structure S2, although it does contain a variable of type "long" in structure S2. The table 500 shown in FIG. 5 shows that record R4 (shown in the table 600 in FIG. 6) shows that the two values of C correspond to each other, even though they are of different types. Therefore, the "int" value of C for the expected data structure is taken from the "long" value of C in the received data structure.

Alternatively, for example, the entity may be using the second version 200 of the data structure, and may receive a first version 100 of the data structure. In this case, the received data structure contains an integer D. As the entity is currently using the second version 200 of the data structure whereby the structure var1 does not include the integer D, this information in the received data structure is not used. However, the received data structure does not contain a character F in var1. Therefore, the record R7, shown in the table 600 in FIG. 6, is used to assign the character value 'B' to F.

FIG. 7 shows a version table 700 for the S3 data structure. The first version 100 of the data structure includes a S3 further data structure var2. The second version 200 of the data structure does not include var2. Therefore, there is only one version (V1) of the S3 data structure. The version table 700 contains or points to one record (R8) corresponding to the integer I. FIG. 8 shows a table 800 including the record R8. The record R8 has no interpretation rules as there are no other versions of the data structure.

Figures 10, 11:
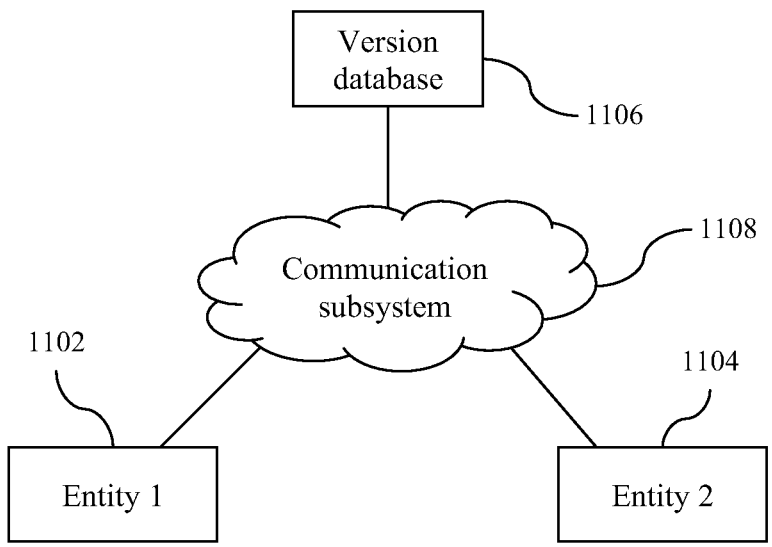
FIG. 10 shows another example of a table containing version records.
FIG. 11 shows an example of a system.

Similarly, FIG. 9 shows a version table 900 for the S4 data structure, which is included in the second version 200 of the data structure as the variable var3. There is only one version (V1) of the S4 data structure containing or pointing to a single record (R9) corresponding to the integer variable J. FIG. 10 shows a table 1000 showing the record R9.

FIG. 11 shows an example of a system 1100 including a first entity 1102, second entity 1104 and version database 1106. The first and second entities can communicate with each other using a communication system 1108. That is, the first entity 1102 can send information (such as a data structure) to the second entity 1104, and/or the second entity 1104 can send information to the first entity 1102. Where the entities are processes executing on one or more data processing systems, for example, the communication system 1108 may comprise or include an inter-process communication (IPC) system.

The system 1100 also includes a version database 1106. The version database 1106 stores version information in respect of one or more data structures that are exchanged between the first and second entities 1102 and 1104. For example, the version database 1106 stores a version table and records for data structures, and may also store further version tables and records for any further data structures (that is, data structures within other data structures).

The version database 1106 may also be connected to the communication system 1108. The first 1102 and second 1104 entity may be able to communicate with the version database 1106 and/or receive information from the version database 1106. In embodiments of the invention, the entities are processes executing on one or more data processing systems. Software may be provided to the data processing systems that allow the entities to interpret data structures received by those entities. The data processing systems may include operating systems. The operating systems may be provided with, for example, operating system functions that can be used to interpret data received in the form of a data structure.

Figure 12:
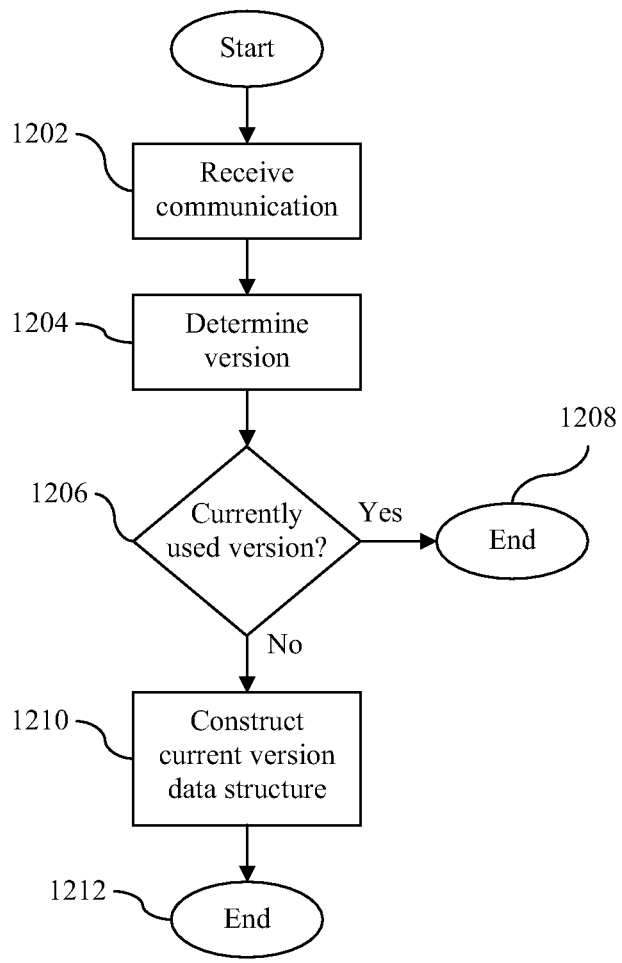
FIG. 12 shows an example of a method of interpreting data according to embodiments of the invention.

FIG. 12 shows an example of a method 1200 of interpreting a data structure according to embodiments of the invention. The method 1200 starts at step 1202 where an entity receives a communication that includes a data structure. Next, at step 1204, the version of the received data structure is determined. This may be done, for example, by examining a predetermined portion of the data structure (for example, the first few bytes). Thus, the data structure may contain information that indicates the version of the data structure. Alternatively, for example, the version information may be determined using some other criteria, for example from the entity that sent the data structure, the size of the data structure and/or other information contained within the received communication.

Once the version of the received data structure has been determined in step 1204, the version is compared with the version of the data structure currently used by the entity that received the data structure. If the received data structure has the same version, then no interpretation is required and the method 1200 ends at step 1208.

If the versions are different, then the data in the received data structure is interpreted. In step 1210, a current version of the data structure is created, containing no information. Then, information in the received data structure is interpreted according to interpretation rules. For example, information may be copied from fields in the received data structure to fields in the constructed data structure, with conversion where appropriate. Additionally or alternatively, one or more fields in the constructed data structure are given default values. Once this is complete, the entity that received the data structure has constructed a data structure of the currently used version that contains information from the received data structure and default values according to the interpretation rules. The method 1200 then ends at step 1212. The entity may then use the data and information within the constructed data structure as appropriate.

In alternative embodiments of the invention, for example, the entity, instead of constructing a whole current version data structure as indicated above, may instead extract information from the received data structure according to the interpretation rules. For example, where the entity wishes to extract information from a field in a currently used version of the data structure, it may extract this information from the received data structure instead or choose a default value according to the interpretation rules.

In the above description, the example of processes communicating using inter-process communication (IPC) was provided. However, the invention should not be limited to such an example. In alternative embodiments, the invention can be used where any entity is exchanging information with any other entity using a data structure, and using any communication mechanism. For example, two processes, data processing systems or any other types of entity may exchange information over one or more communication systems, such as, for example, IPC systems, network communication systems (such as wired systems, wireless systems, internet protocol-based systems) and any other communication systems.

In the above description, records and pointers are given symbolic names (for example, R1, PS2V1). However, the actual form of these records and/or pointers may be different when implemented and may depend on implementation details. Additionally or alternatively, where tables are described, the version database may contain those tables or data that describes the information in those tables. The version database may be implemented, for example, as one or more databases that reside on one or more data processing systems that may or may not be remote from one or both of the entities.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of interpreting data in a first version of a data structure, the method comprising:
    receiving, via sharing of data across multiple processes using Inter-Process Communication (IPC), a first version of a data structure from a first processing entity of a distributed processing system;
    receiving a version record table, wherein a version record includes information on corresponding fields within the first version of the data structure and a currently used version of the data structure and an interpretation rule;
    determining a version of the first version of the data structure by examining a predetermined portion of the first version of the data structure;
    comparing the version of the first version of the data structure to a version of the currently used version of the data structure;
    if the versions are different, creating a blank currently used version of the data structure; and
    then for each field of the blank currently used version of the data structure, determining if a corresponding field is present in the first version of the data structure by consulting the version record table; if so, copying data from the corresponding field in the first version of the data structure to the field in the blank currently used version of the data structure; and if not, adding data to the field in the blank currently used version of the data structure according to an interpretation rule without updating a format of the currently used version of the data structure.

2. A method as claimed in claim 1, wherein the interpretation rules include rules for copying data into fields in the blank currently used version of the data structure from one or more other fields in the first version of the data structure.

3. A method as claimed in claim 1, wherein the interpretation rules include default values for fields in the blank currently used version of the data structure with no corresponding fields in the first version of the data structure.

4. A system for interpreting data in a first version of a data structure, the system comprising:
    a distributed processing system comprising a first processor and a second processor, the first processor to receive the first version of the data structure from the second processor via sharing of data across multiple processes using Inter-Process Communication (IPC);
    a memory coupled to the first processor;
    wherein the first processor:
    receives a version record table, wherein a version record includes information on corresponding fields within the first version of the data structure and a currently used version of the data structure and an interpretation rule;
    determines a version of the first version of the data structure by examining a predetermined portion of the first version of the data structure;
    compares the version of the first version of the data structure to a version of the currently used version of the data structure;
    if the versions are different, creates a blank currently used version of the data structure; and
    then for each field of the blank currently used version of the data structure, determines if a corresponding field is present in the first version of the data structure by consulting the version record table; if so, copying data from the corresponding field in the first version of the data structure to the field in the blank currently used version of the data structure; and if not, adding data to the field in the blank currently used version of the data structure according to an interpretation rule without updating a format of the currently used version of the data structure.

5. A system as claimed in claim 4, wherein the interpretation rules include rules for copying data into fields in the blank currently used version of the data structure from one or more other fields in the first version of the data structure.

6. A system as claimed in claim 4, wherein the interpretation rules include default values for fields in the blank currently used version of the data structure with no corresponding fields in the first version of the data structure.

7. A machine-readable storage medium comprising executable instructions that, when executed, cause one or more processors to:
- receive, via sharing of data across multiple processes using Inter-Process Communication (IPC), a first version of a data structure from a first processing entity of a distributed processing system;
- receive a version record table, wherein a version record includes information on corresponding fields within the first version of the data structure and a currently used version of the data structure and an interpretation rule;
- determine a version of the first version of the data structure by examining a predetermined portion of the first version of the data structure;
- compare the version of the first version of the data structure to a version of the currently used version of the data structure;
- if the versions are different, create a blank currently used version of the data structure; and
- then for each field of the blank currently used version of the data structure, determine if a corresponding field is present in the first version of the data structure by consulting the version record table; if so, copying data from the corresponding field in the first version of the data structure to the field in the blank currently used version of the data structure; and if not, adding data to the blank field in the currently used version of the data structure according to an interpretation rule without updating a format of the currently used version of the data structure.

8. A data processing system having loaded therein a computer program as claimed in claim 7.

* * * * *